United States Patent [19]

Davis

[11] Patent Number: 4,797,460

[45] Date of Patent: Jan. 10, 1989

[54] TACKIFIER RESIN COMPOSITION AND PROCESS FOR PREPARING SAME

[75] Inventor: Curry B. Davis, Panama City, Fla.

[73] Assignee: Arizona Chemical Company, Panama City, Fla.

[21] Appl. No.: 2,040

[22] Filed: Jan. 12, 1987

[51] Int. Cl.$^4$ .................... C08F 212/00; C08F 212/08
[52] U.S. Cl. .................................. 526/281; 526/308
[58] Field of Search ............................. 526/281, 308

[56] References Cited

U.S. PATENT DOCUMENTS

| | | | |
|---|---|---|---|
| 3,299,170 | 1/1967 | Gonzenbach et al. | 260/846 |
| 3,500,239 | 4/1970 | Tendell | 260/889 |
| 3,541,188 | 11/1970 | Srail | 260/889 |
| 3,649,580 | 3/1972 | Arlt, Jr. | 260/17 |
| 3,761,457 | 9/1973 | Arlt, Jr. | 260/88.2 C |
| 3,816,381 | 6/1974 | Phillips | 526/281 |
| 3,976,606 | 8/1976 | Gobran | 260/4 |
| 3,979,371 | 9/1976 | Ruckel | 526/273 |
| 3,989,658 | 11/1976 | Hokama | 526/281 |
| 4,016,346 | 4/1977 | Wojcik | 526/281 |
| 4,057,682 | 11/1977 | Runckel | 526/281 |
| 4,080,320 | 3/1978 | Schluenz et al. | 260/78 |
| 4,098,982 | 7/1978 | Wojcik | 526/233 |
| 4,131,567 | 12/1978 | Wojcik | 252/435 |
| 4,377,510 | 3/1983 | Ruckel | 260/97 |
| 4,536,332 | 8/1985 | Davis | 260/97 |
| 4,670,504 | 6/1987 | Cardenas et al. | 526/281 |

*Primary Examiner*—Paul R. Michl
*Assistant Examiner*—Mark R. Buscher
*Attorney, Agent, or Firm*—Luedeka, Hodges & Neely

[57] ABSTRACT

A resinous composition useful as a tackifier for hot melt and pressure sensitive adhesives is produced by the cationic copolymerization of an isomerizate of turpentine or alpha-pinene and a vinyl benzene derivative.

9 Claims, No Drawings

TACKIFIER RESIN COMPOSITION AND PROCESS FOR PREPARING SAME

The present invention relates to a tackifier resin composition and, more particularly, to a tackifier resin produced by the copolymerization of an isomerizate of turpentine or alpha-pinene and a vinyl benzene derivative.

Tackifier resins have been prepared for over forty years by the cationic polymerization of turpentine distillation fractions. The utility of these resins has been demonstrated repeatedly in both solvent-based and hot-melt based adhesives using natural rubber, synthetic rubber, a variety of synthetic elastomers and waxes. The structural characteristics of the terpene monomers, which comprise the turpentine fractions, result in a tackifier resin with superior adhesive properties when compared to resins prepared by the cationic polymerization of petroleum based mixed C5 hydrocarbon feedstocks.

While turpentine is a naturally occurring renewable resource, it is available in only limited quantities and, furthermore, not all turpentine fractions can be readily polymerized.

It is accordingly an object of the present invention to provide a tackifier resin which is well suited for high quality pressure sensitive and hot melt adhesives and which increases the utility of available turpentine feedstocks.

It has now been found that when isomerized turpentine, isomerized alpha-pinene, or mixtures thereof, and a vinyl benzene derivative are copolymerized under cationic conditions, a novel tackifying resin is produced which is highly stable and which retains the best physical and chemical properties of the constituent monomers. Quite unexpectedly, it has also found that the novel tackifier resin of the present invention is produced in high yield and has a high softening point which facilitates its utility and its compounding into hot-melt and pressure sensitive adhesives.

To prepare the tackifier resin of the present invention, the cationic copolymerization of the isomerizate of turpentine or alpha-pinene and the vinyl benzene derivative is advantageously carried out in the presence of a Friedel-Crafts catalyst such as, for example, anhydrous aluminum chloride, stannic chloride, or boron trifluoride. During the reaction, temperatures should be maintained within the range of about 0° C. to about 100° C., and preferably, between about 10° C. and about 60° C. The reaction is usually carried out in the presence of a suitable hydrocarbon solvent, e.g., xylene or hexane, to facilitate mixing of the reactants and to provide better temperature control over the exothermic polymerization reaction. A batch or continuous process can be employed. As will become apparent hereinafter, known procedures for cationic polymerization such as those disclosed in U.S. Pat. Nos. 3,299,170, 3,509,239, and 3,761,457, the disclosures of which are incorporated herein by reference, can be employed in accordance with the present invention to produce the novel tackifier resin.

In the polymerization reaction, the ratio by weight of alpha-pinene isomerizate or turpentine isomerizate to the vinyl benzene derivative can be from about 10:1 to about 1:2, with a range of from about 3:7 to about 1:1 being preferred. While styrene is the preferred vinyl benzene derivative, alpha-methyl styrene, para-methyl styrene, vinyl toluene or mixtures of such vinyl benzene derivatives can also be employed. Vinyl toluene refers to a commerically available isomeric mixture of ortho-, para-, and meta-methyl styrenes.

The turpentine or alpha-pinene isomerizates for use in accordance with the invention can be prepared by simple heat isomerization. The isomerizates need not be free of monomers which do not react during the polymerization reaction although the yield of the tackifier will of course be reduced. For example, crude sulfate turpentine with no preparation other than flash distillation to separate low and high boiling impurities is a suitable feedstock for heat isomerization to produce the turpentine isomerizate. Preferably, the conditins of the isomerization are such that the isomerizates, which contain high percentages of beta-pinene, allo-ocimene and dipentene, are produced in high yield while also minimizing the loss of allo-ocimene through secondary reactions. It has been found that isomerization in the vapor phase at atmospheric pressure and at a temperature range of from about 300° C. to about 340° C. produces suitable isomerizates in high yield and at useful rates. If desired, the crude isomerizates can be fractionated before polymerization to remove less reactive and lower boiling point components which act as chain terminators in the polymerization reaction. Anti-oxidants can be added to the isomerizates to promote stability during storage.

As mentioned previously, one of the unexpected outstanding physical properties of the tackifier resin of the present invention is its high softening point. Depending on the weight percent of vinyl benzene derivative in the reaction mixture, the softening point can be from about 70° C. to about 110° C.; the maximum increase in softening point is achieved when the vinyl benzene content is about 40% by weight of the total monomer in the reaction mixture. Tackifier resins having enhanced softening points can be achieved using as little as about 10% by weight of vinyl benzene derivative. While high softening points can be achieved even by using quantities in excess of the optimum 40% by weight of vinyl benzene derivative, there is no economic benefit to be realized by adding greater quantities since the softening point begins to decline above 40%. The softening point can be further increased by stream stripping to remove oligomers from the resin.

By contrast, when either isomerizate is polymerized alone, an oil or semi-solid is produced which is not usable as a tackifier resin. Similarly, when styrene alone is polymerized, under batch cationic reaction conditions, the product is an oil which is also unusable as a tackifier resin.

The tackifier resin of the present invention can be used as a component of a hot-melt adhesive wherein, typically, ethylene-vinyl acetate, wax and the tackifier resin are combined by mixing and melting together. The resulting hot melt adhesive is used in, for example, carton sealing, by remelting it, applying it to the substrate, and then effecting a bond with the substrate by cooling.

Hot melts can also be coated on a substrate and then allowed to cool. Thereafter, the substrate is reactivated by heating and then sealed to another substrate. The tackifier resins of the present invention are ideally suited for this application.

The tackifier resins of the present invention can also be employed in the manufacture of pressure sensitive adhesives. When the tackifier resins of the present invention are compounded with, for example, styrene-butadiene or styrene-isoprene elastomers, they exhibit excellent adhesive properties.

The following examples further illustrate the invention and are not intended to limit the scope of the invention as set forth in the claims. Parts and percentages are by weight unless otherwise indicated.

EXAMPLE 1

Alpha-pinene having the approximate composition stated in Table 1 was pyrolyzed in the vapor phase at atmospheric pressure using a hot-tube reactor. For this purpose, a reactor of one-piece borosilicate glass (Pyrex) construction was employed which included a horizontal reaction chamber (ID 4 cm - length 43 cm) packed with protruded stainless steel packing to give plug flow. The reaction chamber was electrically heated in a tube furnace and temperatures were sensed externally with a thermometer and internally with a thermocouple running co-axially down the center of the reaction chamber. A narrow bore glass preheating tube was connected to one end of the reaction chamber tube with the preheating tube being contained within the tube furnace. Liquid alpha-pinene, 0.4 g/minute, was fed with a metering pump into the preheating tube where it was vaporized and preheated before entering the reaction chamber. The reaction was carried out at 318°±5° C. The crude product from the reactor was condensed in an air-cooled glass tube extending outside of the furnace from the end of the reaction chamber tube remote from the preheating tube and the crude product was collected in a 500 ml round bottom flask which was blanketed with nitrogen to protect the product from oxidation.

An anti-oxidant, 2,6-ditertiarybutyl-4-methylphenol, was then added to the crude product in the range of 100 to 1000 ppm.

The crude product was distilled to eliminate a low boiling fraction (87° to 95° C. at 100 mm vacuum) and the monomer recovered in an 86% yield. The isomerizate had the composition stated in Table 1 as determined by gas-liquid chromatography.

TABLE 1

| Component | alpha-Pinene Feed (%) | Distilled Pyrolysis Monomer (%) |
|---|---|---|
| alpha-Pinene | 94.4 | |
| Low Boilers | | 1.1 |
| Camphene | 1.6 | |
| beta-Pinene | 3.8 | 1.3 |
| beta-Pyronene | | 2.6 |
| Myrcene | 0.1 | |
| Dipentene | | 51.1 |
| Allo-ocimene (cis) | | 40.2 |
| Other Hydrocarbons | | 3.4 |

EXAMPLE 2

Crude sulfate turpentine was flash distilled to separate low and high boiling impurities by collecting a fraction which had a boiling point range of 154°–174° C. at atmospheric pressure. This distillate was composed mainly of alpha-pinene (63%), beta-pinene (28%), and dipentene (5%).

Employing the same procedure described in Example 1, the distillate was isomerized at the rate of 0.4 g/minute at 318°±5° C.

Flash distillation of the crude isomerizate to remove low boiling fractions (82°–91° C. at 100 mm vacuum) resulted in a 90% recovery of monomer based on the initial weight of distillate with the composition stated in Table 2.

TABLE 2

| Component | Distilled Pyrolysis Monomer (%) |
|---|---|
| Low Boilers | 2 |
| beta-Pinene | 18 |
| Myrcene | 12 |
| Dipentene | 39 |
| Allo-ocimene | 26 |
| Other Terpene Hydrocarbons | 3 |
| | 97% |

EXAMPLE 3

Five hundred parts of p-xylene were charged to a kettle and stirring was initiated. To the xylene were then added 25 parts of a monomer mixture constituting 70 parts of alpha-pinene isomerizate as prepared in Example 1 and 30 parts of styrene.

To this solution were then added 22 parts of anhydrous aluminum chloride. The catalyzed reaction mixture was allowed to achieve a temperature of 45° C., and cooling was then provided to maintain the temperature at 45° C. Six hundred parts of the same monomer mixture were added with the rate of addition being such that the temperature was maintained at 45° C.

After monomer addition was complete, which took about one hour, the reaction mixture was maintained at 45° C., for two hours. The aluminum chloride was then removed by washing the xylene solution with 0.4% hydrochloric acid followed by deionized water washes until the wash water was neutral. The xylene was then removed by vacuum distillation. The yield of amber colored polymer was 97%, with a ring and ball softening point of 79° C.

EXAMPLE 4

Eight hundred parts of xylene solvent were blended with 750 parts of alpha-pinene isomerizate as prepared in Example 1 and 250 parts styrene. The reaction was run in a small reaction vessel with an addition rate so that the average residence time was one hour. As the monomer-solvent blend was added, the product overflowed into a secondary reactor where it accumulated. Both the primary and secondary reactors were heated or cooled as required to maintain 45° C. temperature. Thirty-three parts of aluminum chloride catalyst were added in increments to the primary reactor to maintain an average concentration of 3.3% based on the monomer. After the addition was complete, the reaction was maintained at 45° C. for one hour before it was washed with dilute hydrochloric acid and then twice with water. Vacuum distillation to remove the xylene solvent gave an amorphous, amber resin in 98% yield having a 96° C. ring and ball softening point.

EXAMPLE 5

Example 4 was repeated with allo-ocimene of 99% purity instead of the alpha-pinene isomerizate. After the washing with hydrochloric acid and water and vacuum distillation to remove xylene, an oil was obtained. A gel phase chromatograph indicated that a dimer of allo-ocimene was essentially the only product.

EXAMPLE 6

Following the procedure of Example 3, a series of tackifier resins were produced from isomerized alpha-pinene as prepared in Example 1. The monomers used, proportions employed, and the properties of the resins produced are detailed in Table 3 below.

TABLE 3

| Resin | Ratio alpha-Pinene Isomerizate/ Styrene | Softening[a] Point |
|---|---|---|
| A | 100/0 | 61 |
| B | 90/10 | 70 |
| C | 75/25 | 79 |
| D | 60/40 | 90 |
| E | 50/50 | 87 |
| F | 40/60 | 80 |
| G | 20/80 | Oil |
| H[b] | 72/28 | 80 |
| I[c] | 55/45 | 102 |
| J[d] | 70/30 | 58 |

[a]Ring and ball softening point °C. (ASTM E-28-58T)
[b]Vinyl toluene used in place of styrene
[c]p-Methyl styrene used in place of styrene
[d]alpha-Methyl styrene used in place of styrene Resin C and D were steam-stripped in a 500-ml three-neck flask equipped with an overhead stirrer, steam sparge tube, and a vacuum distillate take off. Steam was sparged through the resin at 240° C. for 30 minutes with the vacuum held at 50 mm. Steam and oils were condensed in a water-cooled condenser. The steam stripping of resins C and D produced resins C-S and D-S with softening points of 100° C. and 105° C., respectfully.

EXAMPLE 7

Following the procedure of Example 4, a series of hard tackifier resins were produced from isomerized turpentine as prepared in Example 2. The monomers used, proportions employed, and the properties of the resins produced are detailed in Table 4 below.

TABLE 4

| Resin | Ratio Turpentine Isomerizate/ Styrene | Vacuum Steam Stripped Softening Point °C.[a] |
|---|---|---|
| K | 67/33 | 101 |
| L | 75/25 | 101 |
| M[b] | 72/28 | 114 |

[a]Ring and ball softening point ASTM E-28-58T
[b]p-Methyl styrene in place of styrene

EXAMPLE 8

Samples of resin, C-S and D-S from Example 6, were each compounded with 72% ethylene-28% vinyl acetate copolymer sold under the trademark Elvax 250, and a paraffin wax having a melting point of 68° C. sold under the trademark Aristowax 165, in the ratio of 1:1:1 to prepare hot melt adhesives. The hot melt adhesives were prepared in the three-neck, round-bottom flast fitted with an overhead stirrer, thermometer, and nitrogen purge. The wax and resin were charged first and melted by slow heating. No agitation was used until the mass was melted at about 160°. At this point the stirrer was started and the Elvax 250 beads were added slowly while maintaining the temperature between 150° to 160°. The adhesives were held at the temperature for two hours and then poured-up hot. These hot melt blends were evaluated for tensile properties and viscosity stability.

For tensile specimens, sheets were cast 0.050 inches thick and standard dumbbells were cut. Table 5 lists the tensile properties observed.

TABLE 5

| | TENSILE PROPERTIES* | | | | |
|---|---|---|---|---|---|
| Resin | Ratio Isomerizate/ Styrene | Strength at Yield psi | Elongation at Yield % | Strength at Break psi | Elongation at Break % |
| C-S | 75/25 | 500 | 46 | 560 | 440 |
| D-S | 60/40 | 520 | 47 | 620 | 460 |

*Instron crosshead speed 2" per minute

For viscosity stability, the hot melt composition was melted in a 400 ml beaker and stored in a circulating air oven with viscosity being measured at 350° F. initially and after one, two and four days with change of viscosity measured as a percentage of the original. Table 6 lists viscosity properties observed.

TABLE 6

| | VISCOSITY PROPERTIES | | | |
|---|---|---|---|---|
| | Viscosity at 350° F. cps* | % Change in Viscosity Over Time at 350° F. | | |
| Resin | Initially | 1 day | 2 days | 4 days |
| C-S | 1920 | −6 | −15 | −28 |
| D-S | 2000 | −9 | −8 | −35 |

*Centipoise

EXAMPLE 9

Resin L of Example 7 was compounded with a styrene-isoprene block elastomer sold under the trademark KRATON 1107 in the ratio of 60, 80, and 100 phr (parts per hundred parts of rubber) to produce pressure sensitive adhesives. The adhesives were prepared by blending the resin with a 28–30% solids solution of the Kraton 1107 elastomer in toluene in a rolling jar overnight. The resulting solution was coated on polyester film (Mylar) for testing using a draw-down bar. The bar clearance was set to give 1.0 to 1.5 oz/yd² of dry coating (about 0.001 in.). The pressure sensitive data shown in Table 7 was recorded.

TABLE 7

| phr | Tack[a] In. | Probe Tack, g. | 180° Peel, Oz./In. | Shear[b] Minutes |
|---|---|---|---|---|
| 60 | 1 | 660 | 60 | >10,000 |
| 80 | 2 | 775 | 86 | >10,000 |
| 100 | 7 | 930 | 97 | >10,000 |

[a]Rolling ball
[b]Angle 178°, weight 2 kg, ¼ square inch

Example 10

Resin K of Example 7 was compounded with a styrene-butadiene block elastomer sold under the trademark Kraton 1102 at the 60 phr level by the same procedures used in Example 9. The resulting adhesive gave the test results initially and after two week aging at 60° C. shown in Table 8.

TABLE 8

| | Resin | phr | Quick Stick, Oz./In. | 180° Peel, Oz./In. | Shear[a] Minutes |
|---|---|---|---|---|---|
| Zero Time | K | 60 | J[b] | 32 | >10,000 |
| Aged | K | 60 | 22 | 22 | >10,000 |

[a]Angle 178°, weight 2 kg., ½ square inch
[b]J = jerky

I claim:

1. A tackifier resin composition prepared by the copolymerization of A110-ocimene containing isomerizates selected from the class consisting of the reaction product of pyrolysis isomerized turpentine, the reaction product of pyrolysis isomerized alpha-pinene and mixtures thereof and a vinyl benzene derivative selected from a class consisting of styrene, alpha-methyl styrene, para-methyl styrene, vinyl toluene and mixtures thereof.

2. The composition of claim 1 wherein said composition is prepared by the copolymerization of about 50 to about 90 parts by weight of said isomerizate and about 10 to about 50 parts by weight of said vinyl benzene derivative.

3. The composition of claim 1 wherein said vinyl benzene derivative is styrene.

4. A method for preparing a tackifier resin composition comprising copolymerizing A110-ocimene containing isomerizates selected from the class consisting of the reaction product of pyrolysis isomerized turpentine, the reaction product of pyrolysis isomerized alpha-pinene and mixtures thereof and a vinyl benzene derivative selected from the class consisting of styrene, alpha-methyl styrene, para-methyl styrene, vinyl toluene and mixtures thereof.

5. The method of claim 4 wherein about 50 to about 90 parts of said isomerizate and about 10 to about 50 parts of said vinyl benzene derivative are copolymerized.

6. The method of claim 4 wherein said vinyl benzene derivative is styrene.

7. The method of claim 4 wherein said isomerizate and said vinyl benzene derivative are copolymerized in the presence of a Friedel-Crafts catalyst and a hydrocarbon solvent.

8. The method of claim 4 wherein said copolymerizing is performed at a temperature of from about 0° C. to about 100° C.

9. The method of claim 4 wherein said copolymerizing is performed at a temperature of from about 10° C. to about 60° C.

* * * * *

UNITED STATES PATENT AND TRADEMARK OFFICE
CERTIFICATE OF CORRECTION

PATENT NO. : 4,797,460
DATED : January 10, 1989
INVENTOR(S) : Curry B. Davis

It is certified that error appears in the above-identified patent and that said Letters Patent is hereby corrected as shown below:

Col. 2, line 14, "conditins" should be -- conditions --.

Col. 2, line 45, "stream" should be -- steam --.

Col. 5, line 61, "flast" should be -- flask --.

Col. 7, line 12, "All0-ocimene" should be -- allo-ocimene --.

Col. 8, line 2, "All0-ocimene" should be -- allo-ocimene --.

Signed and Sealed this

Sixth Day of June, 1989

Attest:

DONALD J. QUIGG

Attesting Officer

Commissioner of Patents and Trademarks